(12) United States Patent  
May et al.

(10) Patent No.: US 9,840,687 B2  
(45) Date of Patent: Dec. 12, 2017

(54) ARTIFICIAL AGING APPARATUS FOR SPIRITS AND OTHER ALCOHOLIC BEVERAGES

(71) Applicants: Kenneth May, Troy, AL (US); Johnny W Allen, Troy, AL (US)

(72) Inventors: Kenneth May, Troy, AL (US); Johnny W Allen, Troy, AL (US)

(73) Assignees: CONECUH SPRINGS SPIRITS, INC, Troy, AL (US); SPIRITS OF THE U.S.A., Cumming, GA (US)

( * ) Notice: Subject to any disclaimer, the term of this patent is extended or adjusted under 35 U.S.C. 154(b) by 167 days.

(21) Appl. No.: 14/809,330

(22) Filed: Jul. 27, 2015

(65) Prior Publication Data

US 2016/0040106 A1 Feb. 11, 2016

Related U.S. Application Data

(60) Provisional application No. 62/034,286, filed on Aug. 7, 2014.

(51) Int. Cl.
*C12G 3/06* (2006.01)
*C12H 1/22* (2006.01)
*C12H 1/16* (2006.01)
*C12H 1/14* (2006.01)

(52) U.S. Cl.
CPC .............. *C12H 1/22* (2013.01); *C12H 1/14* (2013.01); *C12H 1/165* (2013.01)

(58) Field of Classification Search
CPC .. C12H 1/14; C12H 1/165; C12H 1/22; F24C 15/18

USPC ....... 99/275, 276, 277, 277.1; 210/200, 222, 210/230, 600, 695; 366/273; 203/18

See application file for complete search history.

(56) References Cited

U.S. PATENT DOCUMENTS

| | | | | |
|---|---|---|---|---|
| 4,350,708 A | * | 9/1982 | Ruiz de Palacios | A23L 27/11 426/11 |
| 4,534,282 A | * | 8/1985 | Marinoza | A23C 3/076 210/764 |
| 6,689,401 B1 | * | 2/2004 | Pfisterer | C12C 12/04 426/11 |
| 9,200,243 B2 | * | 12/2015 | Mosier | C12G 3/08 |
| 2010/0104705 A1 | * | 4/2010 | Gordon | A23L 2/44 426/238 |

(Continued)

FOREIGN PATENT DOCUMENTS

CN 103305393 * 9/2013

*Primary Examiner* — Dana Ross
*Assistant Examiner* — Joseph Iskra

(57) ABSTRACT

An artificial aging apparatus for spirits and other alcoholic beverages to decrease the time it takes for alcoholic beverages to mature. The artificial aging apparatus includes an inlet, an outlet, a processing pipe, a pump, a housing, a plurality of electromagnets, a plurality of copper probes, an ultraviolet (UV) radiation source, and a power source. The alcoholic beverage is pumped through the inlet and then into the processing pipe. Subsequently, the alcoholic beverages passes through an electromagnetic field generated to expedite aging, past a plurality of copper probes to smooth the alcoholic beverage, and exposed to the UV radiation source for sanitization. Then, the alcoholic beverage is discharged from the outlet for storage or packaged for consumption.

11 Claims, 4 Drawing Sheets

(56) References Cited

U.S. PATENT DOCUMENTS

2011/0143000 A1\* 6/2011 Fiset .................. A23L 3/28
   426/248
2014/0302201 A1\* 10/2014 Clark, III ............. C12H 1/10
   426/87

\* cited by examiner

ARTIFICIAL AGING APPARATUS FOR SPIRITS AND OTHER ALCOHOLIC BEVERAGES

The current application claims a priority to the U.S. Provisional Patent application Ser. No. 62/034,286 filed on Aug. 7, 2014.

FIELD OF THE INVENTION

The present invention relates generally to an apparatus for aging alcoholic beverages and spirits. More specifically, the present invention relates to an apparatus for accelerating the aging process of alcoholic beverages and spirits.

BACKGROUND OF THE INVENTION

A distilled beverage, spirit, liquor, or hard liquor is an alcoholic beverage produced by distillation of a mixture produced from alcoholic fermentation, such as rum, vodka, tequila, gin, whisky, or brandy. These beverages are aged over a long period of time, generally years to decades, to produce a desired flavor, texture, and/or aroma. Some types of wines are also aged over an extended period of time.

Traditional methods of aging have included leaving the beverages in containers, such as bottles, tanks, or barrels, wherein they undergo a maturing process in which oxygen is allowed to slowly diffuse through the containers and react with the alcohol over several years. As stated, this method of aging is slow and generally requires the allocation of extra funds and labor to create and maintain specialized storage rooms for the containers with specific temperature, humidity, and ventilation requirements. As the containers are generally gas permeable in order to allow air to diffuse through the container, the spirit or wine will diffuse into gaseous form as the concentration of alcohol and water differs from the conditions external to the container. As evaporation occurs, a considerable loss of product is observed over the duration of the aging process.

Certain techniques have been used to accelerate the aging process of spirits and wines, decreasing the amount of product lost compared to traditional means. In other known systems, the alcoholic liquids are subjected, in their vessels, to high-frequency, in particular ultrasonic-frequency, mechanical vibrations. These systems prove difficult to scale up for large vessels, such as casks, because they require a substantial construction effort and use of a great amount of power, yielding high costs.

The present invention provides an apparatus for accelerating the aging of alcoholic liquids, particularly distilled spirits and wines. Through the utilization of magnetic fields, the aging time for alcoholic liquids is significantly reduced while producing the same results as traditional aging processes, which may take years to complete.

DETAIL DESCRIPTIONS OF THE INVENTION

All illustrations of the drawings are for the purpose of describing selected versions of the present invention and are not intended to limit the scope of the present invention.

The present invention is an artificial aging apparatus for spirits and other alcoholic beverages. Traditionally, alcoholic beverages are aged by storing the alcoholic beverage within a storage container for several years. During this time, some of the alcoholic beverage is lost through evaporation. The present invention reduces the necessary time to achieve a desired flavor and palatability of the alcoholic beverage.

Figure 1:
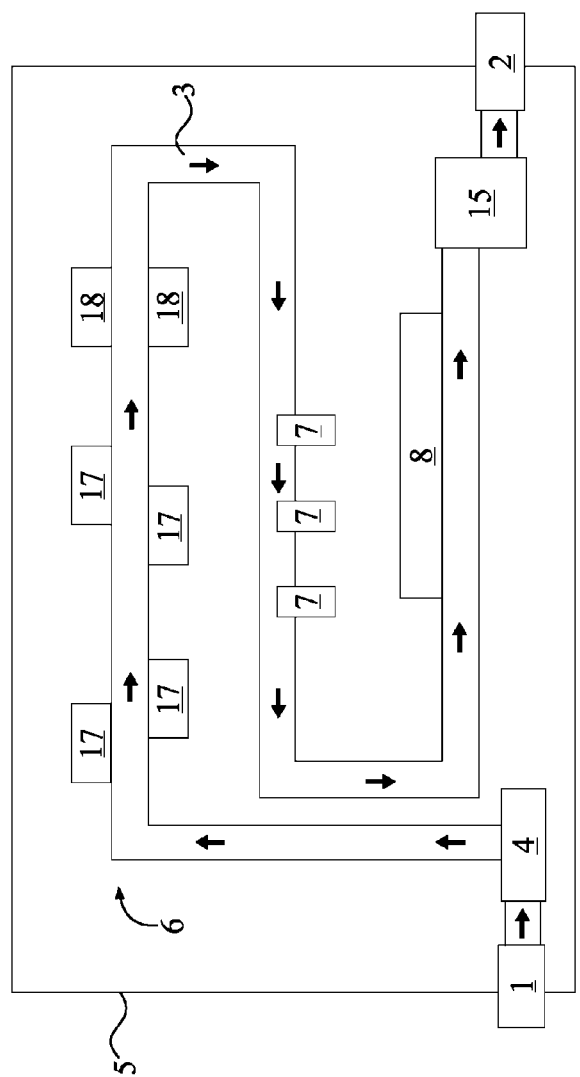
FIG. 1 is a schematic diagram for the simplest embodiment of the present invention.
Figure 3:
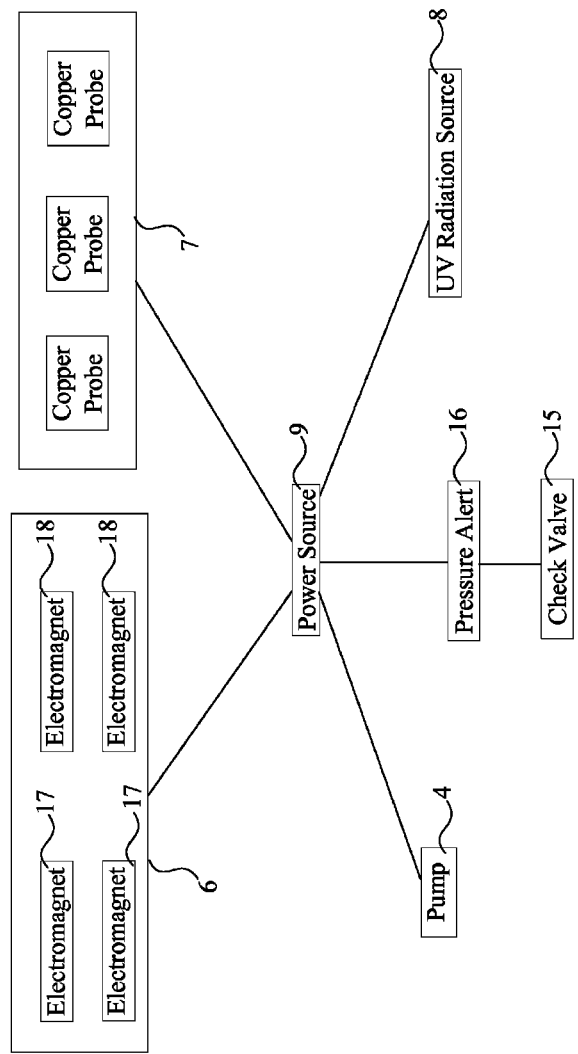
FIG. 3 is a block diagram exemplifying the connections of the electrical components for the present invention.

In accordance to FIG. 1 and FIG. 3, the present invention comprises an inlet 1, an outlet 2, a processing pipe 3, a pump 4, a housing 5, a plurality of electromagnets 6, a plurality of copper probes 7, an ultraviolet (UV) radiation source 8 and a power source 9. The inlet 1 is a juncture which the alcoholic beverage flows into the housing 5, whereas the outlet 2 is a juncture which traverses through the housing 5, such that the alcoholic beverage flow out from the housing 5. The processing pipe 3 is a conduit which the alcoholic beverage flows through. The pump 4 increases the hydraulic pressure difference within the present invention in order to drive the alcoholic beverage through the present invention. The housing 5 encloses and protects the electrical components, including the plurality of electromagnets 6, the plurality of copper probes 7, the UV radiation source 8, and the power source 9, as well as the processing pipe 3. The plurality of electromagnets 6 generates an electromagnetic field to act on the alcoholic beverage as it flows through the processing pipe 3. The plurality of copper probes 7 imparts copper ions to the alcoholic beverage, assuaging the bitter taste of the alcoholic beverage. The UV radiation source 8 uses UV radiation to sanitize the alcoholic beverage as it passes through the present invention. The power source 9 is electrically connected to the plurality of electromagnets 6, the plurality of copper probes 7, and the UV radiation source 8 in order to power the plurality of electromagnets 6, the plurality of copper probes 7, and the UV radiation source 8.

In accordance to FIG. 1, the inlet 1 traverses into the housing 5. The inlet 1 is in fluid communication with the pump 4, and the pump 4 is in fluid communication with the processing pipe 3, such that the pump 4 forces the alcoholic beverage from the inlet 1 and into the processing pipe 3. The processing pipe 3 is in fluid communication with the outlet 2 such that the alcoholic beverage is able to flow from the processing pipe 3 through the outlet 2.

As the alcoholic beverage is pumped through the processing pipe 3, the alcoholic beverage first passes through an electromagnetic field. As previously mentioned, the electromagnetic field is generated by the plurality of electromagnets 6, which are mounted within the housing 5 adjacent to the processing pipe 3. The alcoholic beverage is affected by the electromagnetic field such that the molecules of the alcoholic beverage are excited increasing the aging process greatly. A portion of the processing pipe 3, which is adjacent to the plurality of electromagnets 6 and affected by the electromagnetic field, is preferred to be made of Pyrex, or similar material, such that the electromagnetic field is not obscured or distorted by the processing pipe 3. The electromagnets within the plurality of electromagnets 6 are preferred to be V-block electromagnets such that the electromagnets conform around the processing pipe 3 to maximize the area of effect of the magnetic field.

Figure 2:
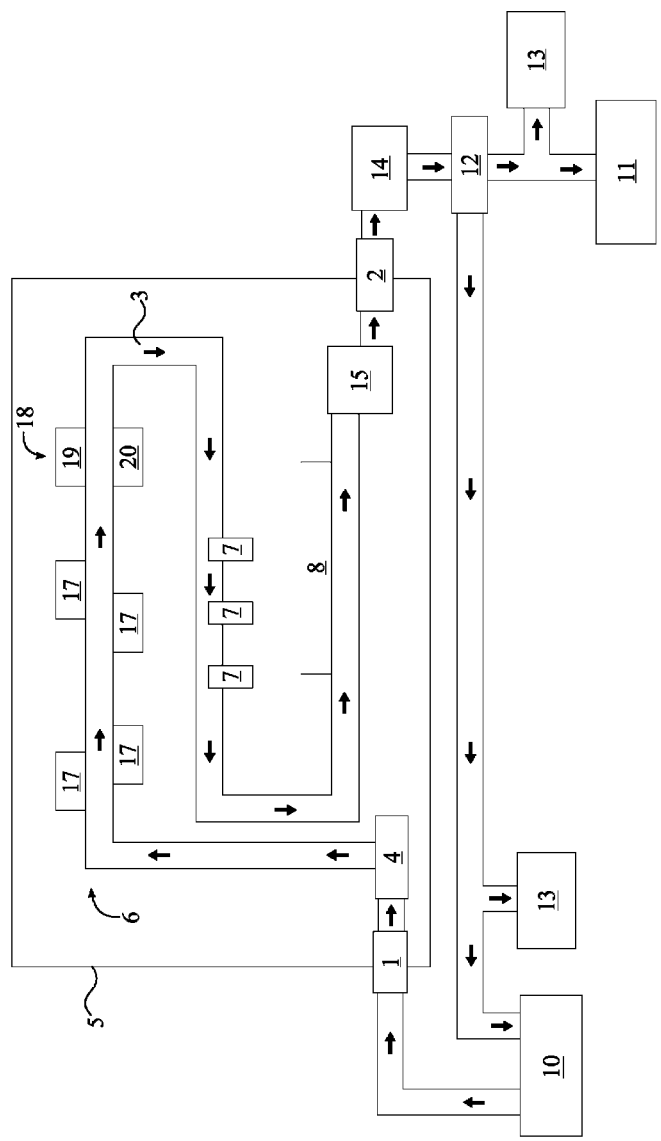
FIG. 2 is a schematic diagram for the preferred embodiment of the present invention.

As can be seen in FIG. 1 and FIG. 2, the plurality of electromagnets 6 comprises an at least one first pair of electromagnets 17 and an at least one second pair of electromagnets 18. The at least one first pair of electromagnets 17 and the at least one second pair of electromagnets 18 are serial positioned along the processing pipe 3, such that the alcoholic beverage initially flows past the at least one first pair of electromagnets 17 and then flows past the at least one second pair of electromagnets 18. The at least one first pair of electromagnets 17 is diametrically opposed to each other about the processing pipe 3. The at least one first pair of electromagnets 17 are offset to each other along the processing pipe 3, in order to produce a preferred electromagnetic field profile. The at least one second pair of electromagnets 18 are diametrically opposed to each other about the processing pipe 3, and the at least one second pair of electromagnets 18 are aligned to each other along the processing pipe 3.

Figure 4:
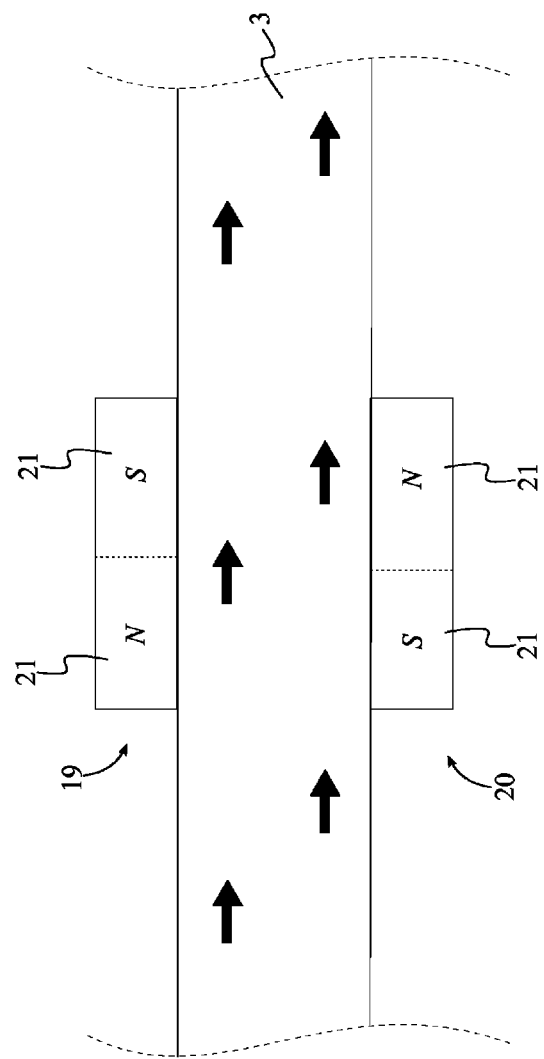
FIG. 4 is a detailed block diagram detailing an exemplary orientation of the pair of poles for both the first electromagnet and the second electromagnet of the at least one second pair of magnets.

In accordance to the preferred embodiment, the at least one second pair of electromagnets 18 comprises a first electromagnet 19 and a second electromagnet 20. Each of the first electromagnet 19 and the second electromagnet 20 comprise a pair of poles 21, as shown in FIG. 4. The pair of poles 21 of the first electromagnet 19 are magnetically oriented opposite to the pair of poles 21 of the second electromagnet 20. For example, the first electromagnet 19 is oriented with a north pole upstream and a south pole downstream to the direction of flow of the alcoholic beverage and the second electromagnet 20 is oriented with a north pole downstream and a south pole upstream to the direction of flow of the alcoholic beverage. This orientation of the first electromagnet 19 and the second electromagnet 20 allows for a strong magnetic field through the processing pipe 3.

From the plurality of electromagnets 6, the alcoholic beverage flows past the plurality of copper probes 7. The plurality of copper probes 7 sealably traverse into the processing pipe 3 such that the plurality of copper probes 7 is in fluid contact with the alcoholic beverage during implementation of the present invention. The plurality of copper probes 7 undergo an oxidation-reduction reaction to impart copper ions into the alcoholic beverage. The plurality of copper probes 7 increase the concentration of copper ions to approximately 2 parts per million (ppm). The concentration of copper ions smooth the taste of the alcoholic beverage in order to reduce the bitterness of the alcoholic beverage, making the alcoholic beverage more palatable. Additionally, the copper ions assist in precipitating undesirable molecules, such as sulfur based compounds, from the alcoholic beverage. The plurality of copper probes 7 is positioned between the plurality of electromagnets 6 and the UV radiation source 8 along the processing pipe 3.

In accordance to the preferred embodiment, the UV radiation source 8 is mounted within the housing 5 adjacent to the processing pipe 3. The UV radiation source 8 emits UV light through a translucent portion of the processing pipe 3. The translucent portion of the processing pipe 3 is preferred such that the processing pipe 3 does not obscure and limit the effectiveness of the UV radiation. The UV light eliminates any organic contaminants within the alcoholic beverage, thus, purifying the alcoholic beverage as it passes the UV radiation source 8 through the processing pipe 3.

In some embodiments, the present invention comprises an initial storage container 10 and a final storage container 11. The initial storage container 10 is a vessel which holds the pre-processed alcoholic beverage to be treated by the present invention. The initial storage container 10 and the final storage container 11 are externally positioned to the housing 5. The initial storage container 10 is in fluid communication with the inlet 1. When the present invention is implemented, the alcoholic beverage is drawn from the initial storage container 10 through the inlet 1 and subsequently through the pump 4, the processing pipe 3, and the outlet 2.

The final storage container 11 is a vessel which holds post-processed artificially-aged alcoholic beverages. The outlet 2 is in fluid communication to the final storage container 11. As the alcoholic beverage is pumped through the present invention and out from the outlet 2, the post processed alcoholic beverage flows into the final storage container 11, where the alcoholic beverage is stored for bottling or shipment.

In accordance to the preferred embodiment, the present invention comprises a diverter 12. The diverter 12 is externally positioned to the housing 5. The outlet 2 is in fluid communication with the diverter 12, such that the diverter 12 splits the fluid stream from the outlet 2 so a portion of the alcoholic beverage is able to be recirculated and reprocessed any number of times to achieve the desired flavor, texture, and aroma of the alcoholic beverage. The diverter 12 is in fluid communication with the initial storage container 10 and the final storage container 11. Thus, allowing a portion of the post processed alcoholic beverage is recirculated into the initial storage container 10 to be reprocessed if it did not met specifications, while the remaining portion is able to flow into the final storage container 11 for storage.

In order to control the quality of the alcoholic beverage, samples of the effluent alcoholic beverage are tested in order to ensure a consistent product. In accordance to FIG. 2, the present invention comprises a sample port 13. The sample port 13 allows a user to extract a portion of the post processed alcoholic beverage for testing. The sample port 13 is in fluid communication with the diverter 12 in order to extract a portion of the post processed alcoholic beverage. In some embodiments of the present invention, the sample port 13 is positioned between the diverter 12 and the initial storage container 10 such that the recirculated stream is assessed and changes can be made to ensure a quality alcoholic beverage. In some other embodiments, the sample port 13 is positioned between the diverter 12 and the final storage container 11 in order to ensure the quality of the final product stored within the final storage container 11.

In order to regulate and determine the flow rate of the alcoholic beverage through the present invention, the present invention comprises a flow meter 14. The outlet 2 is in fluid communication with the diverter 12 through the flow meter 14 such that the flow meter 14 acquires flow data, including fluid velocity, from the effluent stream. Knowing flow data allows the operator knowledge of fouling and flow conditions within the processing pipe 3. If the flow rate is drastically lower than from startup conditions, it is possible that build-up within the processing pipe 3 restricts the flow of the alcoholic beverage through the present invention or that the pump 4 is performing suboptimal or malfunctioning.

To prevent backflow through the present invention, some embodiments of the present invention comprise a check valve 15. The check valve 15 is preferred to be a spring-loaded back pressure valve which allows for unidirectional flow through the present invention. The check valve 15 is positioned within the housing 5. The processing pipe 3 is in fluid communication with the outlet 2 through the check valve 15. The check valve 15 opens when a pressure greater than the rated pressure is applied to a hinged seal within the check valve 15. When there is a hydraulic pressure difference opposite to the intended direction of flow, the hinged seal is pressed against an interior wall preventing a fluid from progressing past the check valve 15 in an unintentional direction.

Further, the present invention comprises a low pressure alarm 16 to notify the user of a potential flow issue. The low pressure alarm 16 is electronically connected to the check valve 15, wherein the low pressure alarm 16 is triggered when the processing pipe 3 is closed off by the check valve 15. Therefore, when there is a backpressure or extremely low flow through the check valve 15 and the check valve 15 is closed, the low pressure alarm 16 signals a user to provide maintenance to the present invention to ensure that the present invention is functioning properly.

Although the invention has been explained in relation to its preferred embodiment, it is to be understood that many other possible modifications and variations can be made without departing from the spirit and scope of the invention as hereinafter claimed.

What is claimed is:

1. An artificial aging apparatus for spirits and other alcoholic beverages comprises:
    an inlet;
    an outlet;
    a processing pipe;
    a pump;
    a housing;
    a plurality of electromagnets;
    a plurality of copper probes;
    an ultraviolet (UV) radiation source;
    a power source;
    the inlet traversing into the housing;
    the outlet traversing out of the housing;
    the inlet being fluid communication with the pump;
    the pump being in fluid communication with the processing pipe;
    the processing pipe being in fluid communication with the outlet;
    the plurality of electromagnets being mounted within the housing, adjacent to the processing pipe;
    the plurality of copper probes sealably traversing into the processing pipe;
    the UV radiation source being mounted within the housing, adjacent to the processing pipe;
    the plurality of copper probes being positioned between the plurality of electromagnets and the UV radiation source along the processing pipe;
    the plurality of electromagnets, the UV radiation source, and the pump being electrically connected to the power source;
    a diverter;
    an initial storage container;
    a final storage container;
    the diverter being externally positioned to the housing;
    the outlet being in fluid communication with the diverter; and
    the diverter being in fluid communication with the initial storage container and the final storage container.

2. The artificial aging apparatus for spirits and other alcoholic beverages, as claimed in claim 1, comprises:
    the initial storage container and the final storage container being externally positioned to the housing;
    the initial storage container being in fluid communication to the inlet; and
    the outlet being in fluid communication to the final storage container.

3. The artificial aging apparatus for spirits and other alcoholic beverages, as claimed in claim 1, comprises:
    a sample port;
    the sample port being in fluid communication with the diverter; and
    the sample port being positioned between the diverter and the initial storage container.

4. The artificial aging apparatus for spirits and other alcoholic beverages, as claimed in claim 1, comprises:
    a sample port;
    the sample port being in fluid communication with the diverter; and
    the sample port being positioned between the diverter and the final storage container.

5. The artificial aging apparatus for spirits and other alcoholic beverages, as claimed in claim 1, comprises:
    a flow meter; and
    the outlet being in fluid communication with the diverter through the flow meter.

6. The artificial aging apparatus for spirits and other alcoholic beverages, as claimed in claim 1, comprises:
    a check valve;
    the check valve being positioned within the housing; and
    the processing pipe being in fluid communication with the outlet through the check valve.

7. The artificial aging apparatus for spirits and other alcoholic beverages, as claimed in claim 6, comprises:
    a low pressure alarm;
    the low pressure alarm being electronically connected to the check valve, wherein the low pressure alarm is triggered when the processing pipe is closed off by the check valve.

8. The artificial aging apparatus for spirits and other alcoholic beverages, as claimed in claim 1, comprises:
    the plurality of electromagnets comprises an at least one first pair of electromagnets and an at least one second pair of electromagnets; and
    the at least one first pair of electromagnets and the at least one second pair of electromagnets being serially positioned along the processing pipe.

9. The artificial aging apparatus for spirits and other alcoholic beverages, as claimed in claim 8, comprises:
    the at least one first pair of electromagnets being diametrically opposed to each other about the processing pipe; and
    the at least one first pair of electromagnets being offset to each other along the processing pipe.

10. The artificial aging apparatus for spirits and other alcoholic beverages, as claimed in claim 8, comprises:
    the at least one second pair of electromagnets being diametrically opposed to each other about the processing pipe; and
    the at least one second pair of electromagnets being aligned to each other along the processing pipe.

11. The artificial aging apparatus for spirits and other alcoholic beverages, as claimed in claim 8 comprises:
    the at least one second pair of electromagnet comprises a first electromagnet and a second electromagnet;
    the first electromagnet and the second electromagnet each comprises a pair of poles; and
    the pair of poles of the first electromagnet being magnetically oriented opposite to the pair of poles of the second electromagnet.

* * * * *